US006589781B1

(12) United States Patent  
Lagace et al.

(10) Patent No.: US 6,589,781 B1
(45) Date of Patent: Jul. 8, 2003

(54) FARM COMPOSTING SYSTEM (75) Inventors: Gerald Lagace, Barrie (CA); Thomas Michael Smith, Utopia (CA)

(73) Assignee: G.E.P. Global Earth Products Inc., Utopia (CA)

( * ) Notice: Subject to any disclaimer, the term of this patent is extended or adjusted under 35 U.S.C. 154(b) by 0 days.

(21) Appl. No.: 09/762,060
(22) PCT Filed: Aug. 5, 1999
(86) PCT No.: PCT/CA99/00710
§ 371 (c)(1),
(2), (4) Date: Feb. 1, 2001
(87) PCT Pub. No.: WO00/07961
PCT Pub. Date: Feb. 17, 2000
(Under 37 CFR 1.47)

(30) Foreign Application Priority Data

Aug. 5, 1998 (CA) .............................................. 2244514

(51) Int. Cl.[7] ................................................ C12M 1/02
(52) U.S. Cl. .................................................... 435/290.2
(58) Field of Search ........................... 435/290.1, 290.2, 435/290.4

(56) References Cited

U.S. PATENT DOCUMENTS

| 5,149,196 A | | 9/1992 | Piacentino et al. ......... 366/345 |
|---|---|---|---|
| 5,204,263 A | * | 4/1993 | Finn ........................ 435/290.2 |
| 5,299,888 A | | 4/1994 | Wysong et al. ............... 406/67 |
| 5,309,703 A | | 5/1994 | Brinton ...................... 56/370 |
| 5,405,780 A | | 4/1995 | Hamilton, Jr. ............. 435/135 |
| 5,433,524 A | | 7/1995 | Wüster ..................... 366/244 |
| 5,459,071 A | | 10/1995 | Finn ........................ 435/290.2 |
| 5,494,350 A | | 2/1996 | Childress ................... 366/226 |
| 5,496,730 A | | 3/1996 | Teramachi ............... 435/290.2 |
| 5,591,635 A | | 1/1997 | Young et al. ............. 435/286.1 |
| 5,700,109 A | | 12/1997 | Hund et al. ................. 405/128 |
| 5,716,132 A | | 2/1998 | Chou ....................... 366/129 |
| 6,284,529 B1 | * | 9/2001 | Carrera .................... 435/290.2 |

FOREIGN PATENT DOCUMENTS

| DE | 3924844 A | * | 1/1991 | |
|---|---|---|---|---|
| DE | 4236138 C | * | 7/1993 | |
| DE | 42 36 138 | | 7/1993 | .......... C05F/17/02 |
| DE | 4335201 A | * | 4/1994 | |
| DE | 29502803 U | * | 4/1995 | |
| EP | 0233637 A | * | 8/1987 | |
| FR | 2767819 A | * | 3/1999 | |

* cited by examiner

Primary Examiner—David A. Redding
(74) Attorney, Agent, or Firm—Anthony Asquith & Co.

(57) ABSTRACT

For disposing of liquid pig manure by composting same with solid carbonaceous matter. The composting material is contained in a trough, and is turned by means of an apron, which is supported in a carriage for a travelling along the trough. The apron carries moving rakes which lift and turn the material. The apron can be set to traverse both backwards and forwards. The apron is angled to a bottom-leading configuration during traversing, and the apron is capable of being lifted, to change the angle, when setting up for reversing the traverse.

19 Claims, 10 Drawing Sheets

FARM COMPOSTING SYSTEM

This invention relates to the processing of animal and vegetable waste by composting, on farms, and in particular to the automation and improvement of agricultural composting.

BACKGROUND TO THE INVENTION

The traditional systems for the disposal of waste agricultural materials such as pig manure are being increasingly criticised on environmental grounds. An aim of the invention is to make it possible to dispose of animal manure, especially pig manure, by adding the manure into a composting system. The systems as described herein are aimed at converting pig manure and other organic waste materials into useful material such as fertiliser, in a manner that achieves the conversion more economically and efficiently (and therefore more cost-effectively) than has been the case hitherto.

The mechanically-sophisticated composting systems as described herein, though developed mainly for disposing of pig manure, also dispose of the solid waste material, i.e the material other than the pig manure, in the compost. The systems can be utilised for disposing of vegetable and animal waste generally, as compost.

GENERAL FEATURES OF THE INVENTION

The scope of the invention is defined by the accompanying claims.

Composting systems of the type with which the invention is concerned include bays or troughs, in which the solid material to be composted is heaped. It is an aim of the present invention to add mechanical sophistication to the processing apparatus, which makes it possible to control the composting system parameters. It is an aim of the invention to control and manipulate the process so closely that differences in conditions between different areas of the batch of material can be evened out, thereby rendering the batch more homogeneous. Concentration can be brought to bear on those areas of the batch where composting is proceeding only slowly, whereby all the portions of the batch can gradually be brought to maximum efficiency. In a conventional composting system, it is the presence of slow-to-react regions that delay the completion of the batch. An aim of the invention is to eliminate the slow-to-react regions. That being done, the effect is to reduce the overall time of an aerobic composting session from the usual minimum thirty days to, often, as little as twenty days. With conventional systems, only some regions of a batch were composted at twenty days; with the invention, the aim is to have the whole batch composted in that time.

The invention is mainly intended for use with batch-processing of compost, as distinct from continuous processing. In continuous processing, typically, fresh material to be composted is added at one end to the trough every day, and the material gradually works its way along the trough (by mechanical manipulation) to the other end of the trough, in a sufficient number of days that composting is completed. However, it is difficult to achieve a consistent output with a continuous process, in that, since Tuesday's material remains separated from Monday's material throughout the process, it is difficult to even out variations in the material. With batch processing, the material can be mixed together, which evens out the day-to-day variations. An aim of the invention is to enable the mechanical manipulation needed for mixing the material (which thereby evens out variations in the material), to be combined with the mechanical manipulation needed for turning, lifting, and aerating the material (which thereby promotes the bio-chemical composting reactions).

The apparatus as described herein may be used predominantly as a means for disposing of the pig manure. Pig manure being mainly liquid, it is difficult and expensive to turn pig manure into useful fertiliser. Pig manure generally will not compost itself of its own accord, but rather it has to be mixed with some solid carbonaceous vegetable matter in order to create the conditions in which the (aerobic) microbiological composting reactions can commence.

In treating the pig manure, if the required carbonaceous vegetable matter is available on the farm (corn cobs, straw, etc), that can be used. If not, solid carbonaceous material should be brought in. Brought-in material can be e.g sawdust from a sawmill; carbonaceous material diverted from a landfill, e.g leaves, paper, etc; or such other carbonaceous degradable material as can be obtained cheaply.

The mechanical sophistication needed for the tight control of the process is achieved by arranging for an apron to traverse back and forth through the composting material. The apron carries moving blades for lifting and turning and aerating the composting material. As described, the apron is two-sided; that is to say, the apron can be set to operate in either direction along the trough, and the blades are arranged for direct contact with the material in both directions of traverse.

With the use of the apparatus as described herein, because of the ability for close control of the composting processes, it becomes worthwhile to monitor the parameters of the composting reactions closely, and to make changes accordingly. Treatment materials can be added, aeration can be applied, traverse speeds and traverse frequency can be changed, and so forth. The apparatus can be adapted for slowing down the traverse speed of the apron in areas where aeration is not so advanced, enabling an increased manipulation of the material, to break the material up and expose it to the air to a greater extent in those areas.

The apparatus can be set for traversing the apron back and forth. That is to say, the apparatus is such that the apron can be reversed. Now, in this kind of processing, the apron lies at a substantial angle to the vertical, typically thirty degrees; so, in order to reverse the apron, the apron has to go through a position where the apron is upright. As such, the apron has to be lifted (i.e raised up off the floor of the trough) to enable the apron to pass through the upright position. Means for raising the apron, for reversing the apron, are provided in the apparatus as described herein.

The ability to raise the apron means the apron can be traversed back and forth over and through the composting material. The system can be made very sophisticated, with instrumentation, fine tuning of liquid spray to achieve moisture content, air blasting to give the right oxygen content, and, as mentioned, the means to render the batch as homogenous as possible. With conventional systems, it was not possible to refine the composting process, because close control of the process was not available. It is an aim of the invention that the system now can be refined to the extent as to make it worthwhile to automate the control of the composting process.

Preferably, in the case where the composting process is being carried out primarily as a way of disposing of liquid manure, the spreading of the liquid manure onto the solid carbonaceous material can be automated and controlled. The material can be monitored for moisture content, and the liquid sprayed accordingly.

THE PRIOR ART

Patent publications U.S. Pat. No. 5,459,071 (Finn, October 1995); U.S. Pat. No. 5,405,780 (Hamilton, April 1995); and U.S. Pat. No. 5,149,196 (Piacentino, September 1992) might be considered relevant to the present invention. However, the apparatus illustrated in these publications have not had the ability for the close control of the parameters that comes from back and forth movement of the apron, as described herein.

DETAILED DESCRIPTION OF PREFERRED EMBODIMENTS

By way of further explanation of the invention, exemplary embodiments of the invention will now be described with reference to the accompanying drawings, in which.

The apparatus shown in the accompanying drawings and described below are examples which embody the invention. It should be noted that the scope of the invention is defined by the accompanying claims, and not necessarily by specific features of exemplary embodiments.

Figure 1:
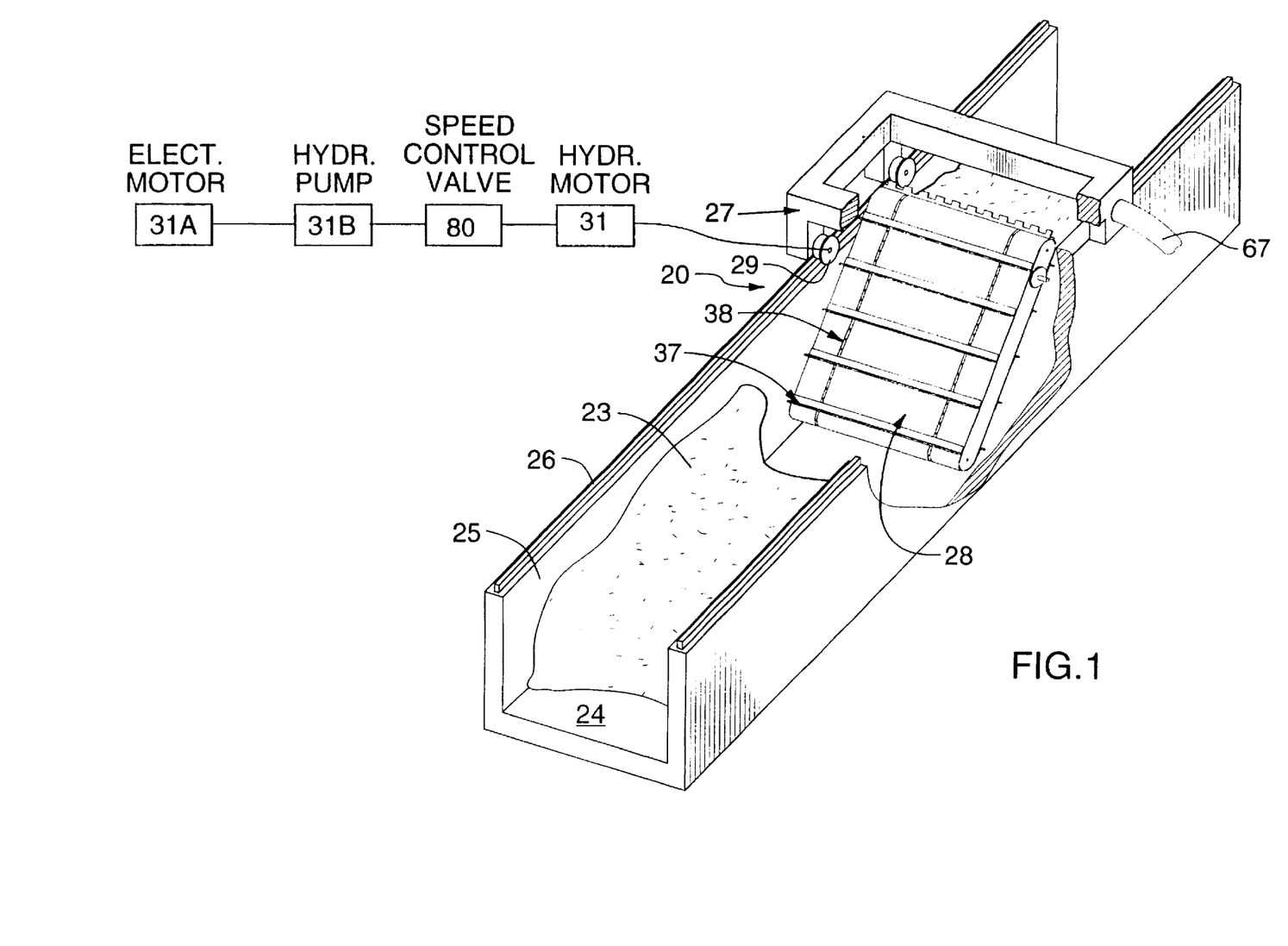
FIG. 1 is a pictorial view of a trough containing composting material, showing a composting system that is an embodiment of the invention.

FIG. 1 shows a bay or trough 20 on a farm, in which is received a body 23 of solid compost material. A batch of the solid material is placed in the trough by means of a front-end-loader or the like. Alternatively, placement of the material in the trough 20 can be automated, e.g by conveyors, if desired. The solid material is predominantly vegetable waste matter from the farm, but solid material can be brought in if more is required.

The trough 20 comprises a floor 24, and left and right walls 25. Surmounting the walls are respective rails 26, for guiding a carriage 27 for movement along the trough. The apron 28 for turning the material being composted is supported from the carriage.

The carriage 27 has four flanged wheels 29, which run on the rails 26. The wheels are driven by respective hydraulic motors, shown diagrammatically at 31. Hydraulic fluid for the motors (and other hydraulic components) can be derived from a source mounted on board the carriage, and control remotely; or the hydraulic fluid can be pressurised elsewhere, and conveyed to the motors via hoses.

Figure 2:
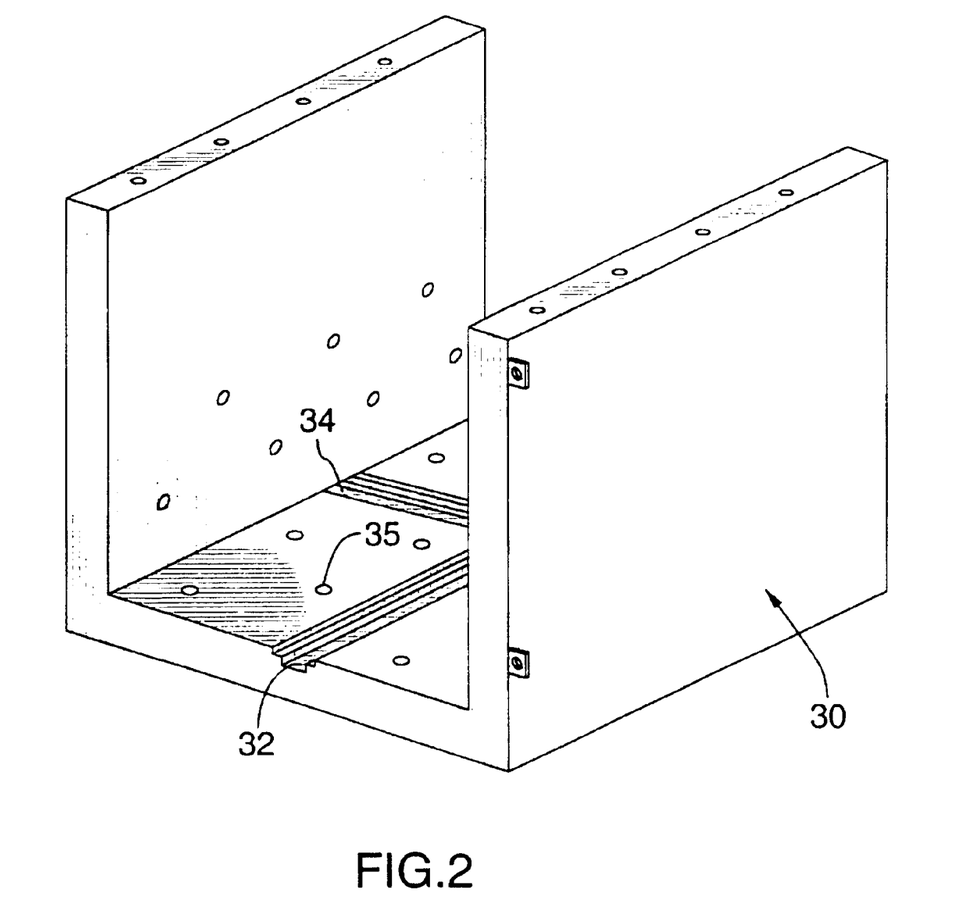
FIG. 2 is view of a section of the trough of FIG. 1.

The walls 25 of the trough are of concrete. The concrete can be cast in-situ; preferably, however, the floor and walls of the trough are formed as a pre-casting 30 (FIG. 2). Typically, the walls are 2 meters high, and the trough is 2½ to 3 meters wide. A typical trough might be 30 meters long.

It is important that the walls of the trough be formed accurately: first, because the rails need to be accurately aligned in order to guide the flanged wheels; and second, because the apron should be guided to run close to the side walls of the trough but without actually touching. Achieving the required degree of accuracy in the case of in-situ casting is very difficult—and it may be noted that correcting a mis-cast trough wall is next to impossible.

The pre-cast concrete sections 30 are made in trough-lengths of 3 meters, for easy transport (by truck) to the farm. The sections 30 can be joined together by welding suitably prepared extensions of the steel reinforcing-bars in the concrete. Similarly, the rails 26 also are attached to extensions of the reinforcing-bars.

The sections 30 are provided with a central gutter 32, for receiving excess liquid that might seep down from the material being composted. Arrangements are made for draining the liquid away from the gutters. The gutter is provided with access ports 34, through which air can be blown to clear the gutters.

Suitable air-passageways 35 are provided in the concrete to enable air to be conveyed periodically, as desired, into the material contained within the trough, for aerating the material.

Figure 3:
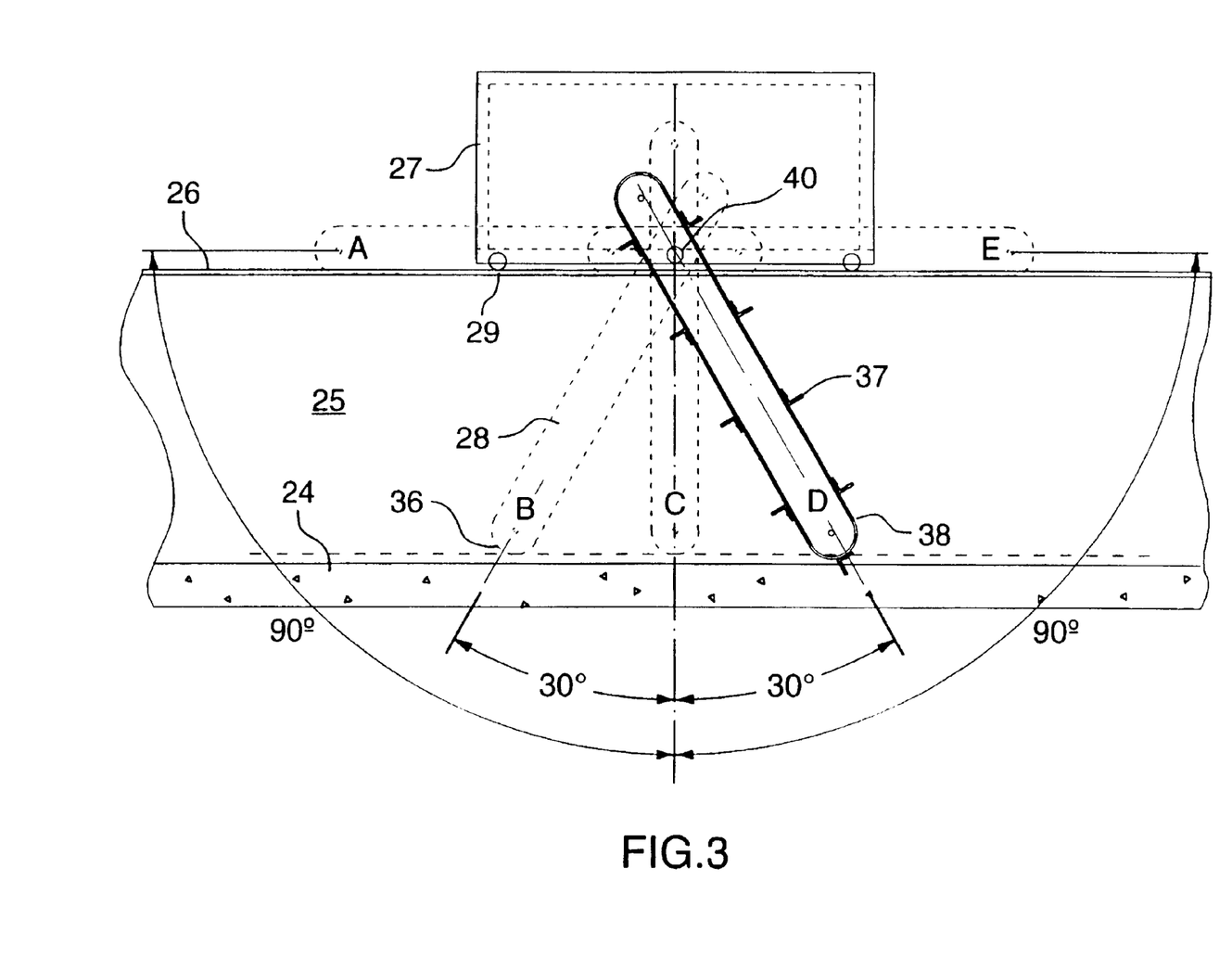
FIG. 3 is a diagrammatic side elevation of the trough of FIG. 1, showing some of the modes of movement of the apparatus.

FIG. 3 shows the manner in which the apron 28 can be moved and adjusted as to its position relative to the carriage 27. When the carriage is traversing from left to right in FIG. 3, the apron is set to position D, i.e with the bottom 38 of the apron leading. When the carriage is traversing from right to left, the apron is set to position B, i.e with the bottom 36 of the apron again leading. As to the motion of the rakes 37, for traversing to the left in position B the rakes are driven clockwise around the apron, and for traversing to the right in position D the rakes are driven anti-clockwise around the apron.

The rakes 37 are coupled to chains 38, and driven endlessly around the frame 39 of the apron. The rakes 37 lift and turn the material, exposing the material to the air.

The ensuing mechanical agitation caused by the rakes also has the effect of stirring the material, thereby tending to even out any differences in the consistency thereof.

When reversing the direction of traverse of the carriage 27, it is required to change the angle of the apron 28, i.e from thirty degrees to the left to thirty degrees to the right. The change in the angle of inclination of the apron is performed by rotating the apron about an apron-pivot axis 40.

In changing the angle of inclination from B to D, the apron passes though an upright position, being position C in FIG. 3. Given that the bottom 36 of the apron should run fairly close to the floor 24 of the trough during traversing, the apron has to be raised, i.e lifted up, as it passes through position C. This lifting of the apron is achieved in the present instance by raising the pivot 40. The angle of inclination during traversing being 30 degrees, the pivot 40 has to be lifted a distance equal to the radius of the apron, i.e the radius from the pivot 40 to the bottom 36, multiplied by 0.27. Thus, where the apron 28 has a radius of 2 meters, the lift distance should be 54 centimeters.

For effective manipulation of the material being composted, the bottom 36 of the apron 28 should run close to the floor 24 of the trough 20. However, preferably the bottom 36 should not actually touch the floor, since if it did the bottom 36 might snag on the floor, and that might tend to jam the apron. Optionally, a slipper placed on the bottom 36 might reduce the possibility of snagging. The direction of travel of the rakes is set, in both directions of traverse, such as to lift the material upwards, and the reaction to such lifting presses the apron downwards. A slipper might be useful in relieving some of that reaction from the area of the pivot 40; however, the apparatus preferably should be designed so as to support the reaction forces in the apron-pivot area, and thereby avoid the need for slippers on the bottom of the apron.

It is possible that too heavy a force might be placed on the apron during traversing of the carriage, such that the trailing wheels 29 of the carriage 27 might tend to lift off the rails 26. If the designer wishes to avoid that possibility, a sensor can be placed in the trailing wheels, whereby, if the component of the weight acting on the trailing wheels should get too close to zero, the speed of traverse can be slowed down.

Figure 4:
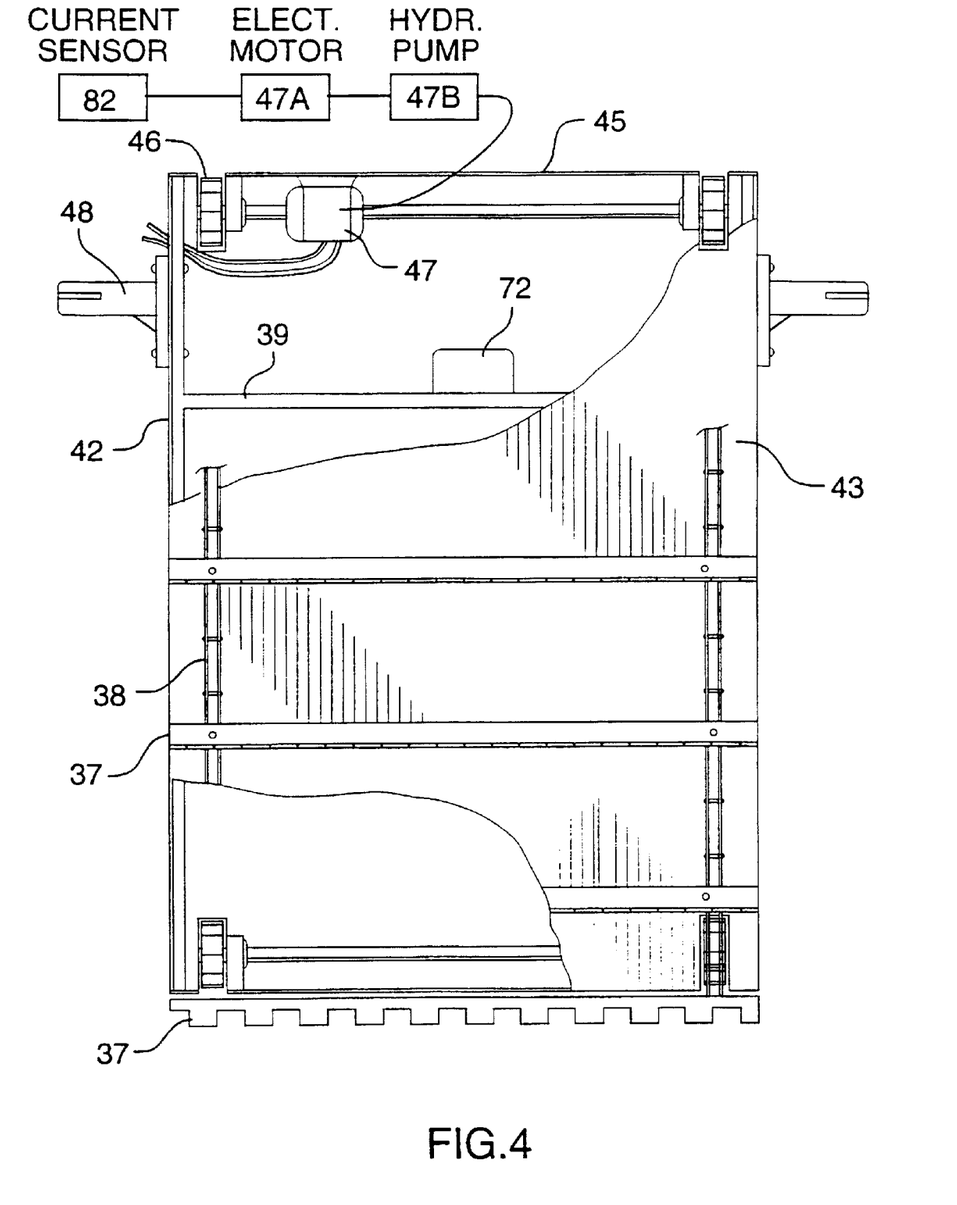
FIG. 4 is an end elevation of an apron of the apparatus.
Figure 5:
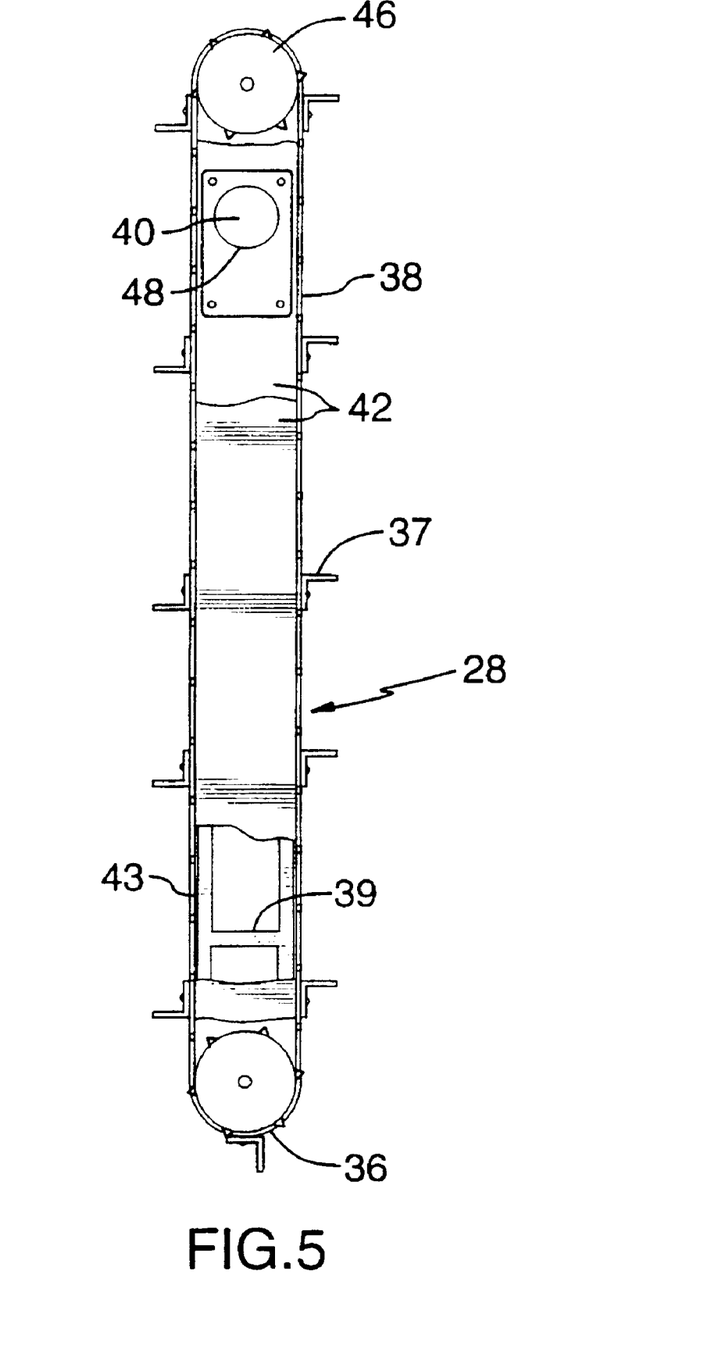
FIG. 5 is a side elevation of the apron.

The structure of the apron is shown in FIGS. 4 and 5. The frame 39 comprises a triangulated lattice of bars, to which are attached side plates 42, and face plates 43 which merge into curved end plates 45. The rakes 37 are fixed to chains 38. Chain wheels 46 guide the chains 38 for endless motion. A chain tensioner may be included. The chain wheels 46 are driven by a hydraulic motor 47.

The apron can be in two (or more) sections (divided along a vertical line) the rakes in the different sections being drivable at different speeds. This refinement permits a degree of enhancement in the manner of manipulating the compost material.

Support for the forces acting on the apron are transferred to the carriage through the apron-pivot 40. The pivot is formed from co-axial stubs 48, which are bolted to the side plates 42 of the apron. The stubs carry respective gear pinions 49, which are keyed against rotation relative to the stubs 48. Changes in the angle of inclination of the apron are effected by rotating the gear pinions 49. Changes in the height of the apron are effected by raising the stubs 48.

Figure 6:
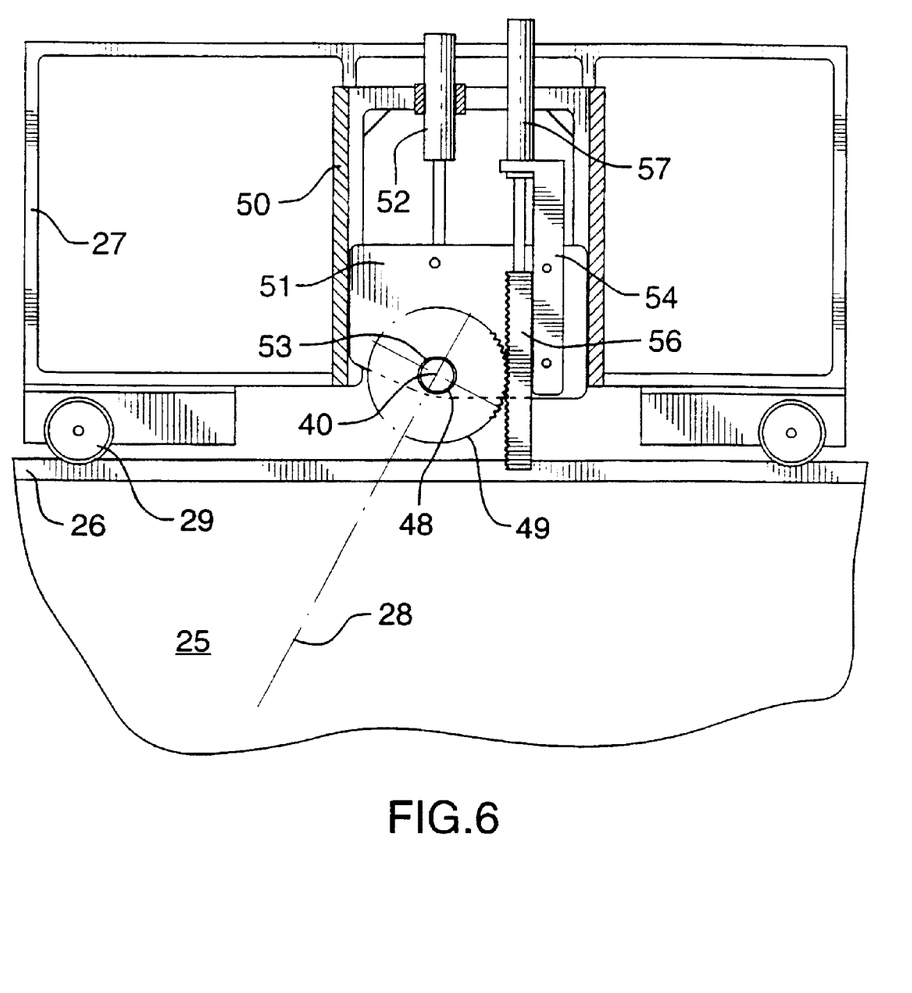
FIG. 6 is a side elevation of a carriage of the apparatus showing the manner of mounting and moving the apron.

The mechanisms for rotating the pinions 49, and for raising/lowering the stubs 48, are located in the carriage 27, and will now be described.

The carriage 27 (FIG. 6) includes a slideway 50, in which a slide 51 is guided for vertical up/down movement. A hydraulic slide-ram 52 controls the height of the slide 51. The slide includes a bearing 53, in which is mounted the appropriate one of the stubs 48 of the apron. The pinion 49 is assembled to the stub 48 after the stubs have been mounted in the bearing 53 (and in the corresponding bearing on the other side of the carriage).

Mounted on the slide 51 is a guideway 54, which guides a rack 56 for up/down movement relative to the slide. The height of the rack 56 is controlled by a rack-ram 57. The rack 56 is in mesh with the pinion 49, and as the rack is driven up/down, the pinion is driven to rotate. It will be noted that, the rack 56 being mounted on the slide 51, the pinion can be rotated (and thus the angle of inclination of the apron 28 can be changed) at any height of the slide 51.

As intimated above, components corresponding to the slide, slideway, rack, pinion, bearings, rams, etc, as just described, are repeated on the other side of the carriage.

Figure 7:
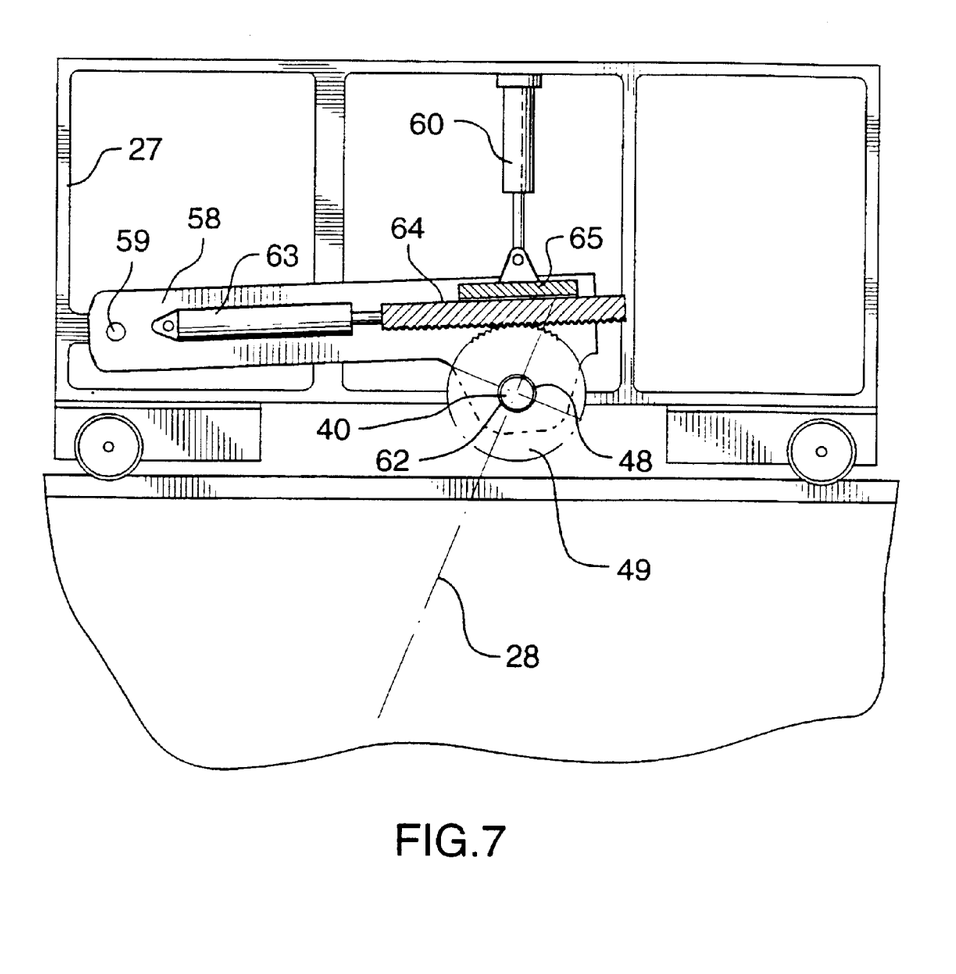
FIG. 7 is a corresponding view to FIG. 6, of a modified apparatus.
Figure 8:
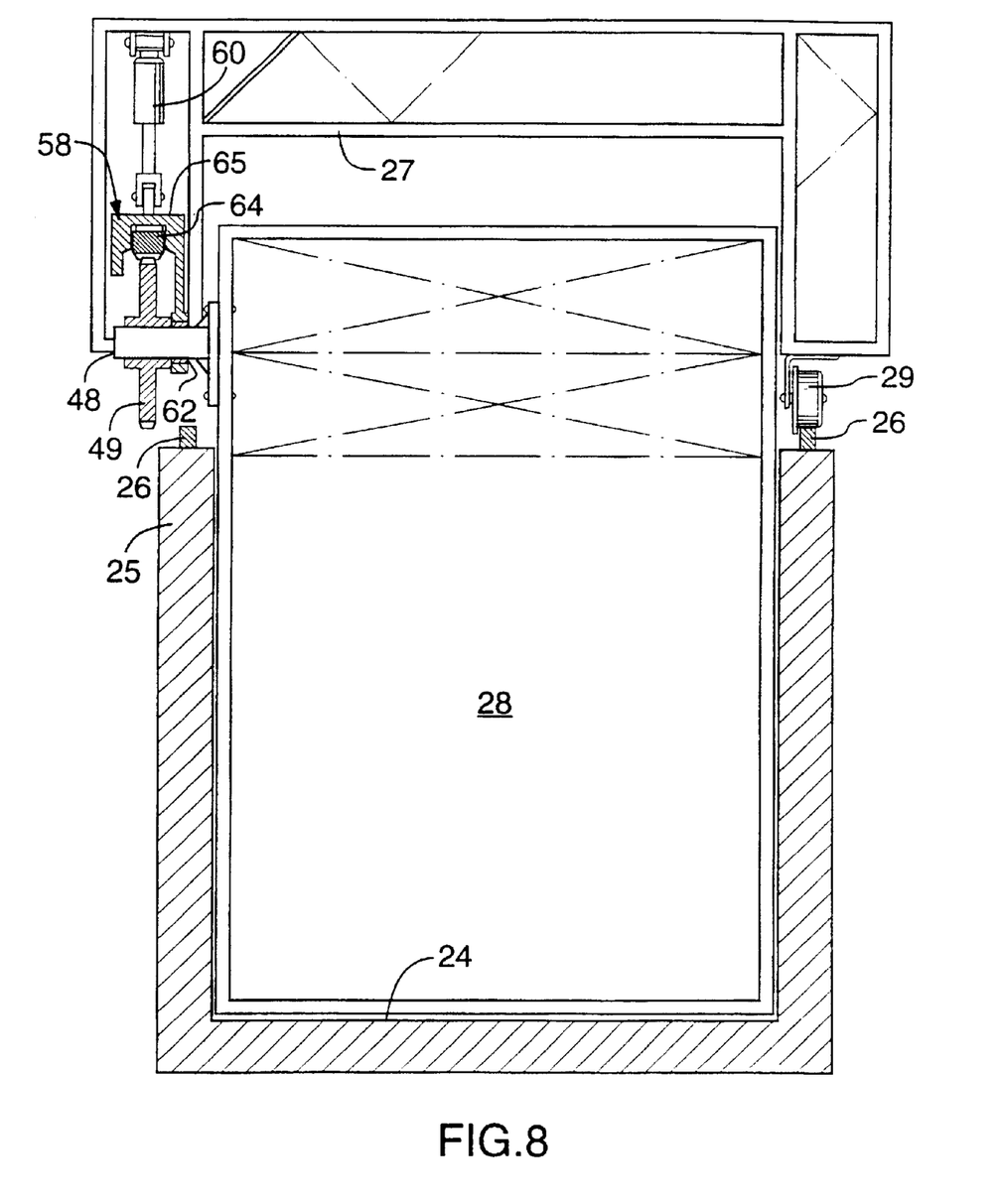
FIG. 8 is an end elevation of the apparatus of FIG. 7.
Figure 9:
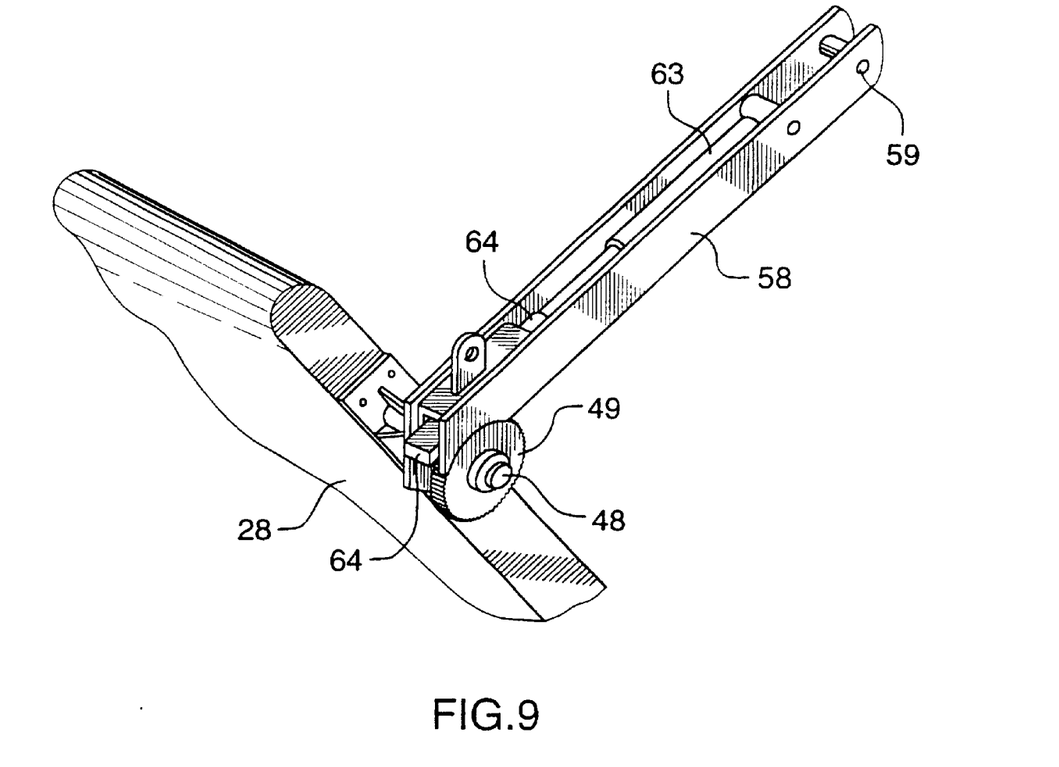
FIG. 9 is a pictorial view of some of the components of the FIG. 7 apparatus.

FIGS. 7 to 9 show a different type of mechanism for raising/lowering the apron 28, and for changing the angle of inclination of the apron. Here, the carriage is provided with an arm 58, which pivots about an arm-pivot 59. The arm 58 is raised/lowered by means of an arm-ram 60. The arm 58 is also provided with a bearing 62, which carries the stub 48 of the apron. A rack-ram 63 is mounted along the length of the arm 58, and is coupled to a rack 64, which is guided in a guideway 65, whereby actuation of the rack-arm 63 is effective to rotate the apron, again independently of the height at which the arm might be set. The compactness of the pivoting-arm design is an attractive feature of this version, as shown in FIG. 7.

In use of the apparatus, the material to be composted is loaded into the trough in some suitable manner, for example by a front-end-loader, or by a conveyor, etc. At first, the batch of materials is non-homogenous, including pockets or clumps of wet, solid, compacted material, clumps of dry material, heavy pieces, light pieces, and so on. The microbiological composting reactions start to get under way, however, provided the constituents of carbon, nitrogen, moisture, etc are present.

Periodically, the apron is passed through the batch of material in the trough. The carriage can be set to traverse along the trough at a speed of about a meter per minute. The rakes 37 are set to move over the face of the apron at a speed of about 2 meters per minute, lifting and turning the material, and transporting the material up and over the apron. From there, the material falls down, and forms a heap behind the apron. It will be noted that the apron extends upwards to a height above that of the trough walls, so the material is tossed quite high in the air as the apron passes, which gives good aeration. The material then falls gently down behind the apron, i.e the material is not compacted in any way, whereby the material remains loose, and open to the air. Air can be blown in through the air-passageways 35, as well.

The rakes can be selected to apply a cutting or shredding action to the material, or merely a lifting action; and the selection of the rakes can be made in accordance with determinations as to the conditions of the material being composted. The traverse speed of the carriage can be adjusted in response to the nature of the material. If the material is heavy and difficult to manipulate, that fact is reflected in the pressure supplied to the wheel hydraulic motors, and the speed of the carriage can be arranged to slow down where such heaviness is encountered. Where the material is lighter, however, the carriage can be advanced at a faster speed. The designer can also arrange for the speed of the rakes over the apron to be adjustable, e.g in response to measurements of the consistency of the material.

As mentioned, the fact that the traverse speed of the apron along the trough can be controlled and adjusted gives rise to improvements in the efficiency of the composting system. Preferably, the designer should arrange that the speed of traverse of the apron is a function of the resistance force on the apron. If resistance is large, which arises if the material is heavy, the apron slows down.

The traverse speed of the apron, being the speed of the apron 28 along the rails 26, is determined by the hydraulic motor 31. The speed of the rakes 37 over the face of the apron 28 is determined by the hydraulic motor 47.

In the preferred control system, the speed of the rakes over the apron, and therefore the speed of the rake motor 47, is kept constant. The driving forces on the rake motor 47 are measured; that is to say, the power supplied to the motor as required in order to maintain the speed of the rakes is measured. The power supplied to the motor may be measured either by measuring the hydraulic pressure to the hydraulic motor 47, or by measuring the electric current to the electric motor 47A that drives the pump 47B that supplies the motor 47 with hydraulic pressure.

As the power supplied to the rake motor increases (indicating a rise in the heaviness of the compost material) so the speed of the apron traverse motor 31 is reduced. By slowing the rate of traverse of the apron through the compost material, so the distance the rakes bite into the compost material per pass of the rakes is made smaller, and therefore the more finely the material is shredded and/or aerated.

The apparatus includes a control system which, by adjusting the speed of traverse of the apron (via motor 31), adjusts the distance the rakes advance or bit into the compost material. The adjustment of the speed of the apron motor 31 is done in such a manner as to keep constant the force on the rakes motor 47, i.e the force needed to drive the rakes motor at the set speed.

The intent is to homogenise the compost material. In this context, it may be noted that materials would be classed as homogenous if, for a given rake speed, the force required to drive the rakes at that speed is constant, whereby the traverse speed of the apron through the material would also be constant. It has been found that, by adjusting the speed at which the apron traverses in response to changes in the force needed to drive the rakes at a set speed, the condition is soon reached at which the force required to drive the rakes at that speed is constant throughout the batch of material. After that, the apron traverses the whole batch of material at more or less constant speed.

As mentioned, the designer should arrange the control system of the apparatus such that the traverse speed of the apron is a function of the force needed to drive the rakes at the set speed. This can be done by means of an automated feedback control system. In the apparatus as described, the hydraulic rake motor 47 is supplied with hydraulic pressure from a pump 47B, powered by an electric motor 47A. The electric motor 47A would be sized in the 40 HP region.

The power needed at the apron motor 31 is much smaller (e.g 4 HP), but again, the power may be derived from a pump 31B driven by an electric motor 31A. The speed of the hydraulic apron motor 31 is controlled by a hydraulic valve 80.

Current to the 40 HP electric motor 47A that drives the apron pump 47B is monitored by means of a current-sensor 82. The output of this sensor is in the form of a DC signal voltage. This signal can be fed, via a conventional programmable logic controller, in which the signal is processed and co-ordinated with other parameters, to the hydraulic control valve 80. The heavier the compost material, the larger the current to the motor 47A, the smaller the hydraulic flow to the motor 31, and the slower the apron advances through the compost material.

Because the apron can be operated in both directions, the traversing of the apron can be utilised to control the conditions of the composting material to a high degree. The speed of the traversing can be controlled, as mentioned, as can the frequency with which the traverses are done.

Liquid manure is sprayed onto the solid composting material as the apron passes. The liquid manure is fed to the carriage via a hose pipe 67. The volumetric flow rate of the liquid manure is controlled in response to the moisture content of the material. In a case where the main purpose of the apparatus is to dispose of the liquid manure, the size of the installation should be such as will absorb all the manure generated on the farm. In that case, it would be preferred that the system be designed so that the available manure would not be quite enough, and the extra liquid requirement would be supplied as water. On the other hand, if an excess of manure is present, and is more than can be applied to the solid material being composted, and if that excess has to be disposed of separately, the quantity of the excess now should be quite small, with the present apparatus. (It may be noted that, prior to installation of the present apparatus, all the pig manure had to be disposed of separately.) The composted material from the present apparatus, into which the liquid manure has been assimilated, can be used as fertiliser, either on the farm, or for sale. The organic fertiliser material is in the form of easy-to-handle solid particles, and is non-smelly, non-polluting, easy to spread, weed-free, pathogen-free, easily mixed with other fertilisers, and inexpensive.

The ability to traverse the apron back and forth through the material in the trough, coupled with monitoring and control of the various parameters, enables the composting reactions to proceed at an even rate throughout the batch of material. As such, the overall time taken to process a batch of material is minimised. When the trough reactions are completed, the material is taken out of the trough, again by front-end-loader, conveyor, etc. The apron with the moving rakes thereon can be used as an element in a conveyor system, to transfer the material out of the trough.

Because the composting reactions can be made to proceed so efficiently, by the use of the apparatus as described, the reactions can cause the temperature in the material to rise to 60 or 65 deg C. If the composting is done in a building, this can cause the temperature in the air in the building to be too hot; the heat can be removed by heat exchanger, and can be used to warm nearby pig-pens, for example.

It will usually be convenient, on a farm, to provide more than one trough. Thus, several batches of material can be processed simultaneously, each at a different reactive stage. On the other hand, just one trough (i.e just one batch) might be acceptable where the main purpose of the system is to dispose of pig manure; the pig manure can be sprayed onto the solid material at almost any stage of the composting reaction, whereby the liquid manure can be disposed of continuously, as it is generated, whereas the solid material is supplied in batches, say once a month.

Figure 10:
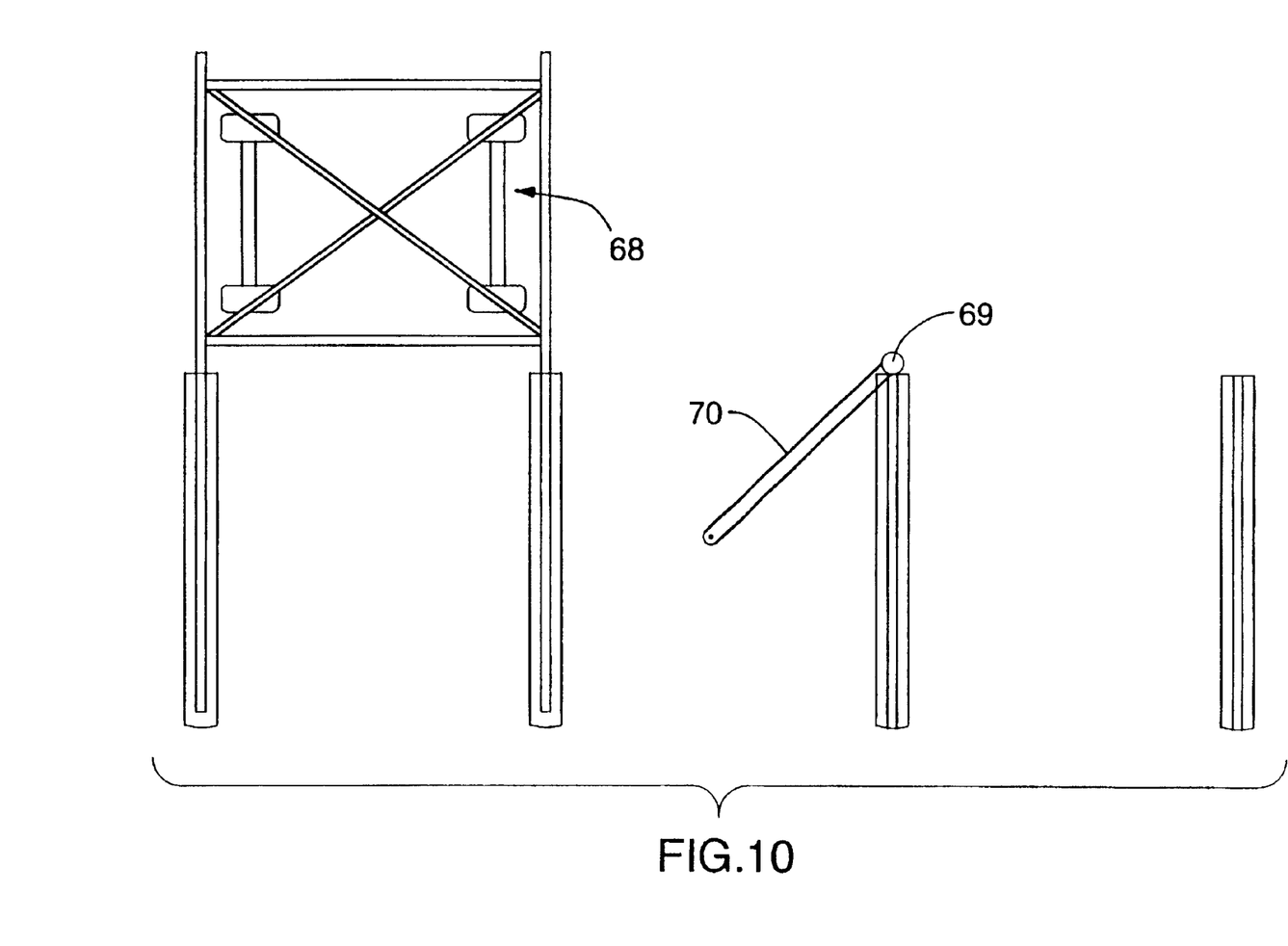
FIG. 10 is a plan view of an area in which a number of troughs are arranged side by side.

When a plurality of troughs are provided, just one apron can be made to serve the several troughs, a means being provided to retrieve the carriage and apron assembly from one trough, and transfer it to the next trough. FIG. 10 shows a trolley 68, which is provided with rails to receive the carriage from the rails of one of the troughs. The trolley is on wheels, on which it can be moved to transfer the carriage to the next trough. FIG. 10 also diagrammatically shows a post 69 to which is attached a jib 70. The jib is used to lift the carriage, and swing it from one trough to the next. The post 69 is removably attached to the end of the appropriate wall between the troughs.

It has been determined that extra mechanical agitation of the composting material can be achieved by attaching a vibration unit 72 to the apron. The unit is powered hydraulically, and includes a rotating weight, which imparts a rapid shaking motion to the apron. These extra modes of movement have been found efficacious, especially in the initial physical or mechanical breaking down of the solid material.

As shown particularly in FIG. 1 and FIG. 8, the carriage 27 is supported on the tops of the walls 25 of the trough 20, and bridges or straddles across the trough. The various moving components and mechanisms for guiding and moving the carriage along the trough are located above, and out of, the compost material heaped in the trough. Similarly, the various moving components and mechanisms for guiding and moving the apron 28 relative to the carriage, both for up/down or height setting of the apron, and for setting the angle of inclination of the apron, are located above, and out of, the compost material heaped in the trough.

German patent publication number DE-4,326,138 may be considered relevant background art.

What is claimed is:

1. Apparatus for processing farm compost material, wherein:
   the apparatus includes a trough, having left and right walls and a floor, and containing a heap of compost material;
   the apparatus includes a carriage, carriage-travel-guide-means for guiding movement of the carriage along the length of the trough, and an operable carriage-driver for driving the carriage into said movement;
   the apparatus includes an apron, which is carried by the carriage, and which is arranged to move along the trough, through the compost material, as the carriage is driven in the said movement;
   the carriage-driver is capable of being operated in either forward or reverse, in that the carriage-driver is so structured that the carriage can be driven in a line from a point X on the trough to a point Y spaced along the length of the trough, and also so that the carriage can be driven in reverse from Y to X;
   the apron has an angle of inclination relative to the carriage, and the apparatus includes an operable apron-angle-setting-means, for changing the said angle of inclination;
   the apparatus is so arranged that the angle of inclination of the apron is capable of being changed between an X-Y-angle and a Y-X-angle, relative to the carriage;
   the apron has a bottom and a top, and, when in the X-Y angle of the apron, the apron is so angled that the bottom of the apron is nearer Y than is the top of the apron;
   when in the Y-X angle of the apron, the apron is so angled that the bottom of the apron is nearer X than is the top of the apron;
   the apparatus includes an operable apron-height-setting-means, for adjusting the height of the apron, whereby the bottom of the apron can be set to a small clearance distance above the floor of the trough, when the apron moves along the trough;
   the apparatus is so arranged that, in changing between the X-Y angle and the Y-X angle, the apron passes through an upright position of the apron, in which the top of the apron lies vertically above the bottom of the apron;
   the apron-height-setting-means is effective to set the height of the apron relative to the trough, and thereby to hold the bottom of the apron clear of the floor of the trough, at all angles of inclination of the apron including the upright position of the apron;
   the walls of the trough include on-trough-carriage-guides, and the carriage-travel-guide-means includes an engagement of the carriage with the on-trough-carriage-guides;
   the arrangement of the carriage and the on-trough-carriage-guides is such that the carriage straddles across the trough, above the heap of compost material in the trough.

2. Apparatus of claim 1, wherein:
   the apron-height-setting-means includes an up/down-guide-means, mounted on the carriage, for guiding an up/down-element;
   the up/down-element is carried by the apron-frame, and remains at a fixed location in the apron-frame when the apron undergoes up/down movement relative to the carriage-frame;
   the apron-angle-setting-means includes an apron-pivot-axle, the axis of which is fixed in the apron-frame;
   the apron-pivot-axle is mounted in the carriage, and the apron-angle-setting-means is effective, when operated, to change the angle of inclination of the apron, about the apron-pivot-axle, relative to the carriage-frame;
   and the up/down-element of the apron-frame comprises the apron-pivot-axle.

3. Apparatus of claim 1 wherein:
   the carriage includes a carriage-frame, and includes an on-carriage-angle-setting-mechanism;
   the on-carriage-angle-setting-mechanism includes all portions of the apron-angle-setting-means that are components of the carriage, and that move relative to the carriage-frame when the apron-angle-setting-means is operated to effect a change in the angle of inclination of the apron;
   the apron includes an apron-frame, and includes an on-apron-angle-setting-mechanism;
   the on-apron-angle-setting-mechanism includes all portions of the apron-angle-setting-means that are components of the apron, and that make contact with the on-carriage-angle-setting-mechanism when the apron-angle-setting-means is operated to effect a change in the angle of inclination of the apron;
   the on-apron-angle-setting-mechanism and the on-carriage-angle-setting-mechanism are so positioned in relation to the heap of compost material in the trough that, during operation of the apron-angle-setting-means, and throughout the length of travel of the apron along the trough, substantially all the structure of the on-apron-angle-setting-mechanism and of the on-carriage-angle-setting-mechanism remains above, and clear of, the heap of compost material.

4. Apparatus of claim 1 wherein:
   the carriage includes a carriage-frame, and includes an on-carriage-height-setting-mechanism;
   the on-carriage-height-setting-mechanism includes all portions of the apron-height-setting-means that are components of the carriage, and that move relative to the carriage-frame when the apron-height-setting-means is operated to effect a change in the height of the apron;
   the apron includes an apron-frame, and includes an on-apron-height-setting-mechanism;
   the on-apron-height-setting-mechanism includes all portions of the apron-height-setting-means that are components of the apron, and that make contact with the on-carriage-height-setting-mechanism when the apron-height-setting-means is operated to effect a change in the height of the apron;
   the on-apron-height-setting-mechanism and the on-carriage-height-setting-mechanism are so positioned in relation to the heap of compost material in the trough that, during operation of the apron-height-setting-means, and throughout the length of travel of the apron along the trough, substantially all the structure of the on-apron-height-setting-mechanism and of the on-carriage-height-setting-mechanism remains above, and clear of, the heap of compost material.

5. Apparatus of claim 1, wherein:
   the carriage includes a carriage-frame, and includes an on-carriage-travel-mechanism;
   the on-carriage-travel-mechanism includes all portions of the carriage-travel-guide-means that are components of the carriage, and all portions of the operable carriage-driver that are components of the carriage, and that move relative to the carriage-frame in response to the carriage-driver being operated to move the carriage along the trough;

the apparatus includes an on-trough-travel-mechanism;

the on-trough-travel-mechanism comprises all portions of the carriage-travel-guide-means, and all portions of the operable carriage-driver, that are components of the trough, and that make contact with the on-carriage-travel-mechanism when the carriage-driver is operated to move the carriage along the trough;

the on-carriage-travel-mechanism and the on-trough-travel-mechanism are so positioned in relation to the heap of compost material in the trough that, during operation of the carriage-driver, and throughout the length of travel of the apron along the trough, substantially all the structure of the on-carriage-travel-mechanism and the on-trough-travel-mechanism remains above, and clear of, the heap of compost material.

6. Apparatus of claim 3, wherein:

the apron-angle-setting-means includes an apron-pivot;

the apron is pivotable about the apron-pivot, for changing the angle of inclination of the apron;

the apron-pivot includes an apron-pivot axle;

the on-apron-angle-setting-mechanism includes a pinion, which is fast with the apron-pivot-axle;

the on-carriage-angle-setting-mechanism includes a rack;

the rack is in mesh with the pinion;

the apron-angle-setting-means includes a means for moving the rack, thereby rotating the pinion, and thereby changing the angle of inclination of the apron.

7. Apparatus of claim 1, wherein:

the apron-height-setting-means includes an up/down-guide-means, mounted on the carriage, for guiding and up/down-element;

the up/down-element is carried by the apron-frame, and remains at a fixed location in the apron-frame when the apron undergoes up/down movement relative to the carriage-frame;

the up/down-guide-means comprises a slideway of the carriage;

the up/down-element on the apron can slide, in the slideway, in an up/down sense, relative to the carriage.

8. Apparatus of claim 1, wherein:

the apron-height-setting-means includes an up/down-guide-means, mounted on the carriage, for guiding an up/down-element;

the up/down-element is carried by the apron-frame, and remains at a fixed location in the apron-frame when the apron undergoes up/down movement relative to the carriage-frame;

the up/down-guide-means comprises an arm, which is arranged for arcuate pivoting about an arm-pivot in the carriage;

the up/down-element on the apron is mounted on the arm, for arcuate pivoting movement in an up/down sense, relative to the carriage.

9. Apparatus of claim 1, wherein, the length L of the apron being the distance between the top and bottom of the apron, the apron-height-setting-means is capable, when operated, of raising the apron a distance of at least L×0•27 when the apron passes through the upright position.

10. Apparatus of claim 1, wherein:

the apron has movable blades, and the apron includes a blade-driver, for moving the blades relative to the apron-frame;

the blade-drier can be driven forwards and in reverse;

the blades are so arranged on the apron as to be effective, when driven, to lift and turn the compost material in the trough, as the apron traverses through the compost material.

11. Apparatus of claim 10, wherein the blade-driver comprises a blade-motor, which is located inside the frame of the apron, and adjacent to the top of the apron.

12. Apparatus of claim 1, wherein:

the walls of the trough are concrete;

the trough is in pre-cast sections, which are individually short relative to the overall length of the trough;

the pre-cast sections are suitable for shipping separately, and assemblable on site;

and the sections include means for connecting adjoining sections together, which are structurally unitary with the reinforcing-bars in the pre-cast concrete sections.

13. Apparatus of claim 12, wherein:

the on-trough-carriage-guides include rails on the walls of the trough, for supporting movement of the carriage along the length of the trough;

and the rails are structurally unitary with reinforcing-bars in the pre-cast concrete sections.

14. Apparatus of claim 1, wherein:

the apparatus includes two or more of the troughs;

the apparatus includes an operable lifting-means, for taking the carriage off the rails at the end of one trough, holding the weight of the carriage, and positioning the carriage on the rails of the next trough.

15. Apparatus of claim 1, wherein:

the apparatus includes a means for adding liquid to the heap of compost material in the trough;

and the means for adding liquid is attached to, and moves along the trough with, the carriage.

16. Apparatus of claim 15, wherein the liquid is, or includes, pig manure.

17. Apparatus of claim 1, wherein the apparatus includes sensor means for measuring moisture content of the material, includes means for spraying liquid pig manure onto the material, and includes means for varying the rate of spray in accordance with measured moisture content.

18. Apparatus of claim 1, wherein the apparatus includes a means for sensing the force required to drive the carriage along the trough, and for reducing the speed of carriage if an excess of the said force is encountered.

19. Apparatus of claim 1, wherein:

the apparatus includes a means for sensing the force required to drive the blade means over the apron, and for issuing a signal indicative of that force;

the apparatus includes an apron-speed-control means, for controlling the carriage-driver as to the speed at which the carriage is driven along the trough;

the apron-speed-control-means is responsive to the said signal, in the sense of controlling the carriage to move more slowly, in proportion to an increase in the force required to drive the blade means.

* * * * *